(12) United States Patent
Wang et al.

(10) Patent No.: US 7,722,804 B2
(45) Date of Patent: May 25, 2010

(54) METHOD OF MANUFACTURING A PRESSED SCANDATE DISPENSER CATHODE

(75) Inventors: Jinshu Wang, Beijing (CN); Wei Liu, Beijing (CN); Meiling Zhou, Beijing (CN); Yiman Wang, Beijing (CN); Hongyi Li, Beijing (CN); Tieyong Zuo, Beijing (CN)

(73) Assignee: Beijing University of Technology, Beijing (CN)

( * ) Notice: Subject to any disclaimer, the term of this patent is extended or adjusted under 35 U.S.C. 154(b) by 534 days.

(21) Appl. No.: 11/835,993

(22) Filed: Aug. 8, 2007

(65) Prior Publication Data
US 2008/0025864 A1 Jan. 31, 2008

Related U.S. Application Data

(63) Continuation of application No. 11/778,485, filed on Jul. 16, 2007, now abandoned.

(30) Foreign Application Priority Data

Jul. 19, 2006 (CN) .......................... 2006 1 0088815

(51) Int. Cl.
*C22C 32/00* (2006.01)
(52) U.S. Cl. ................................ 419/20; 419/5; 419/19; 419/34; 419/39; 75/623; 445/51; 516/88; 313/346 DC
(58) Field of Classification Search ..................... 419/20
See application file for complete search history.

(56) References Cited

U.S. PATENT DOCUMENTS

| | | | | |
|---|---|---|---|---|
| 4,007,393 | A | * | 2/1977 | VAN Stratum et al. ... 313/346 R |
| 4,350,920 | A | * | 9/1982 | Bertens ................. 313/346 R |
| 4,910,079 | A | * | 3/1990 | Shroff et al. ............. 428/306.6 |
| 5,407,633 | A | * | 4/1995 | Hasker et al. ................. 419/19 |
| 5,666,022 | A | * | 9/1997 | Deckers et al. ......... 313/346 DC |
| 2002/0193041 | A1 | * | 12/2002 | Gaertner et al. ............... 445/51 |

OTHER PUBLICATIONS

H Yuan, et al., "Characteristics of scandate-impregnated cathodes with sub-micron scandia-doped matrices" Applied Surface Science 251 (2005) 106-113.*
J. Wang et al., "A Study of Scandia Doped Tungsten Nano-Powders" Journal of Rare Earths 25 (2007) 194-198.*
J. Wang et al., "Scandia-doped tungsten bodies for Sc-type cathodes" Applied Surface Science 215 (2003) 38-48.*
J. Wang et al., "High Current Density Scandia Doped Pressed Cathode and Shaped Beam Generation" Vacuum Electronics Conference, 2007. IVEC '07. IEEE International, May 2007.*
Y. Wang et al., Development of High Current-Density Cathodes With Scandia-Doped Tungsten Powders, IEEE Transactions on Electron Devices, vol. 54, No. 5, May 2007.*
H. Yuan, et al.,"Characteristics of scandate-type cathode with sub-micron structure Sc2O3 doped tungsten bodies" Vacuum Electron Sources Conference, 2004. Proceedings. IVESC 2004. The 5th International. Sep. 2004.*

* cited by examiner

*Primary Examiner*—Roy King
*Assistant Examiner*—Christopher Kessler
(74) *Attorney, Agent, or Firm*—J.C. Patents

(57) ABSTRACT

In a method of manufacturing a pressed scandate dispenser cathode, firstly, scandium nitrate, barium nitrate, calcium nitrate, aluminum nitrate and ammonium metatungstate (AMT) are dissolved in de-ionized water, respectively, and then mixed with a solution of a cross-link agent such as citric acid and $H_2O_2$. After water bathing, the mixed aqueous solution turns into gel, and the powders are obtained after the gel calcination. Secondly, the calcined powders are reduced by hydrogen. Finally, the reduced powders are pressed into shapes and then sintered in the furnace with the atmosphere of hydrogen or by Spark Plasma Sintering (SPS 3.202-MK-V) in vacuum.

10 Claims, 5 Drawing Sheets

METHOD OF MANUFACTURING A PRESSED SCANDATE DISPENSER CATHODE

CROSS-REFERENCE TO RELATED APPLICATION

This application is a continuation of application Ser. No. 11/778,485 filed on Jul. 16, 2007, now abandoned, which claims priority benefit of China application No. 200610088815.5 filed on Jul. 19, 2006. The contents of application Ser. No. 11/778,485 and China application No. 200610088815.5 are each hereby incorporated by reference in its entirety.

FIELD OF THE INVENTION

The present invention relates to a method of manufacturing pressed scandate dispenser cathode, which belongs to the technical field of rare earth-refractory metal cathodes.

BACKGROUND OF THE INVENTION

At present, Ba—W dispenser cathodes composed of the barium calcium aluminates are being used as the cathodes in microwave vacuum electron source devices for various civil and military uses. The development of high frequency and high power microwave devices speeds the requirement for cathodes that can provide high emission current density. However, Ba—W dispenser cathode could not provide enough emission current density to meet such requirement. As a promising and optimal candidate cathode, scandate cathode has shown superior emission property at lower operation temperature over Ba-dispenser cathode, and it could be taken as the future of the thermionic cathodes.

In all kinds of scandate cathodes, lots of attention have been paid to the pressed scandate cathode having such an advantage over the impregnated scandate cathode as its simple preparation process, for example, the cathode could be obtained after high temperature sintering whereas three-step high temperature treatments of high temperature sintering, impregnating at high temperature followed by annealing in hydrogen are indispensable for the preparation of impregnated scandate cathode. However, the pressed scandate cathode has lower emission property than the impregnated cathode, which could be attributed to the non-uniform distribution of various active substances in the cathode and micrometer dimension of matrix structure usually used in the ordinary cathodes. If the sub-micron structure matrix preparation technique and liquid phase doping technology are applied to the manufacturing of the pressed scandate cathode, it is expected to improve the emission performance of this cathode, and thus the said emitter will be the ideal cathode for the microwave vacuum device due to its good emission property and the simple and reproducible preparation process.

SUMMARY OF THE INVENTION

The object of the present invention is to provide a method for fabricating pressed scandate cathode and tungsten powders doped with composite oxides of Ba, Ca, Al and Sc in which these elements are distributed uniformly. After high temperature sintering, high emission cathode with uniform distribution of each element could be obtained.

This invention provides a method of manufacturing pressed scandia doped cathode which is characterized as follows:

(1) Scandium nitrate ($Sc(NO_3)_3 \cdot xH_2O$), barium nitrate $Ba(NO_3)_2$, calcium nitrate ($Ca(NO_3)_2 \cdot xH_2O$), aluminum nitrate ($Al(NO_3)_3 \cdot xH_2O$) and ammonium metatungstate (AMT) (($NH_4)_6H_6W_{12}O_{40} \cdot xH_2O$) are used as the raw materials. 3-5 wt % $Sc_2O_3$ and total content of 5 wt %-15 wt % CaO, $Al_2O_3$ and BaO were added in the form of $Sc(NO_3)_3 \cdot xH_2O$, $Ba(NO_3)_2$, $Ca(NO_3)_2 \cdot xH_2O$, $Al(NO_3)_3 \cdot xH_2O$. In the above molecular formulas, "x" is a positive integer, including zero, representing the number of crystal water in the molecule. Scandium nitrate, calcium nitrate, aluminum nitrate and ammonium metatungstate (AMT) with various number of crystal water or without crystal water can be used in the present invention as the raw material. The raw materials shown above are dissolved in the de-ionized water, respectively, and then mixed with the solution of a cross-linking agent such as citric acid ($H_3$cit in brief) and $H_2O_2$ to form a sol in the water bath at temperatures between 80° C. and 100° C. The sol is dried in the air to form a gel at a temperature between 80° C. and 100° C.

(2) The precursor oxide compounds are obtained by the thermal decomposition of the gel in the atmosphere of air/oxygen at a temperature between 500° C. and 550° C. for 2-5 hours.

(3) The above complex oxide powders are reduced by two steps of reduction at a temperature of 500° C. followed by reduction at a temperature between 850° C. to 1000° C. in the atmosphere of hydrogen.

(4) The cathodes are obtained by pressing as reduced powder at pressures between 1.5 $t/cm^2$ to 2.5 $t/cm^2$ and then sintering in the atmosphere of hydrogen at temperatures between 1450° C. and 1650° C. for 1 to 10 minutes or sintering in vacuum at temperatures between 1100° C. and 1450° C. for 1 to 10 minutes by Spark Plasma Sintering (SPS apparatus type 3.202-MK-V).

The advantages of this invention could be described as follows:

Each element distributes uniformly in the cathode owing to the application of the liquid phase doping technology, see FIG. 1 (FIG. 1 shows SEM micrograph and element mapping images of the pressed scandate cathode). Compared with the manufacturing process of impregnated cathode, during the preparation of pressed cathode, two step heat treatments of impregnation and annealing in hydrogen could be eliminated, indicating that this process has lots of advantages, such as low energy cost, simple and reproducible techniques, which are suitable for the large-scale production. The experimental results show that the cathodes prepared by the method described in this invention have good emission properties. FIG. 2-8 shows the emission current density at 800° $C._b$ of the cathodes sintered at different temperatures. As shown in FIG. 2-8, these cathodes exhibit excellent electron emission property and the emission current density increase with the increase of sintering temperature. Owning to the excellent emission property and simple fabrication process, the cathodes prepared by the method described in this invention will have a wide application in a variety of civil and military microwave vacuum devices.

BRIEF DESCRIPTION OF THE DRAWINGS

The invention will now be described in detail with reference to the accompanying drawings in which.

EXAMPLES

Example 1

Figure 1:
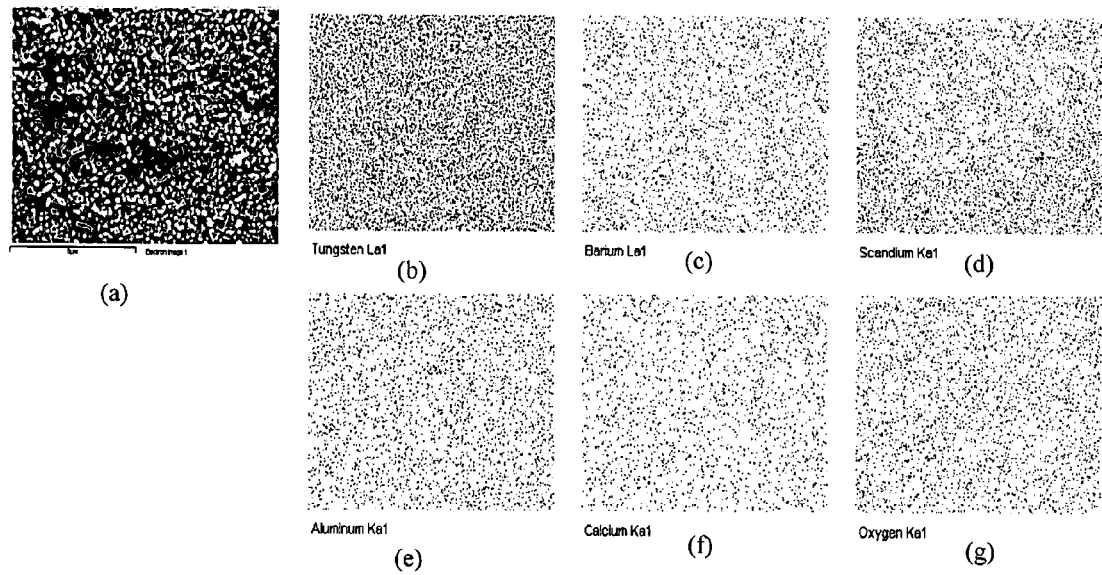
FIG. 1 shows the surface morphology and element (W, Ba, Sc, Al, Ca, O) distribution of the cathodes provided by this invention.
- a: Surface morphology of the cathodes
- b: W mapping on the cathode surface
- c: Ba mapping on the cathode surface
- d: Sc mapping on the cathode surface
- e: Al mapping on the cathode surface
- f: Ca mapping on the cathode surface
- g: O mapping on the cathode surface
Figure 2:
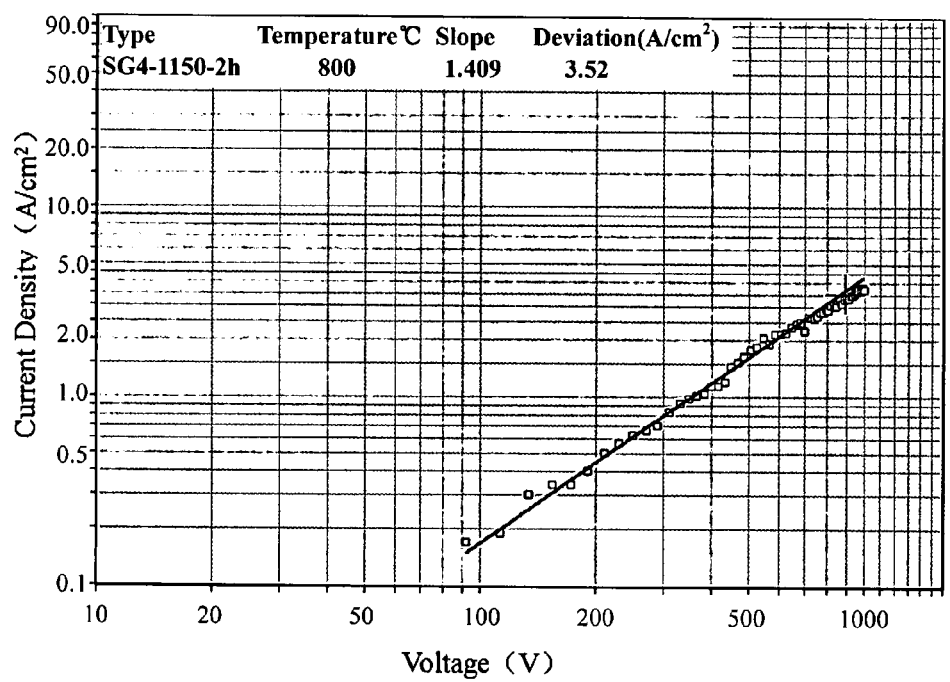
FIG. 2 shows the LgU-LgI plot of the cathode (Example 1) prepared by reduction in the atmosphere of hydrogen at a temperature of 900° C. and then sintering at 1450° C. The precursor powder contains 5% wt $Sc_2O_3$ and 5% wt Barium-Calcium-Aluminates in the ratio of $BaO:CaO:Al_2O_3$ of 4:1:1. The emission current density is 3.52 $A/cm^2$ at 800° $C_{.b}$.
Figure 3:
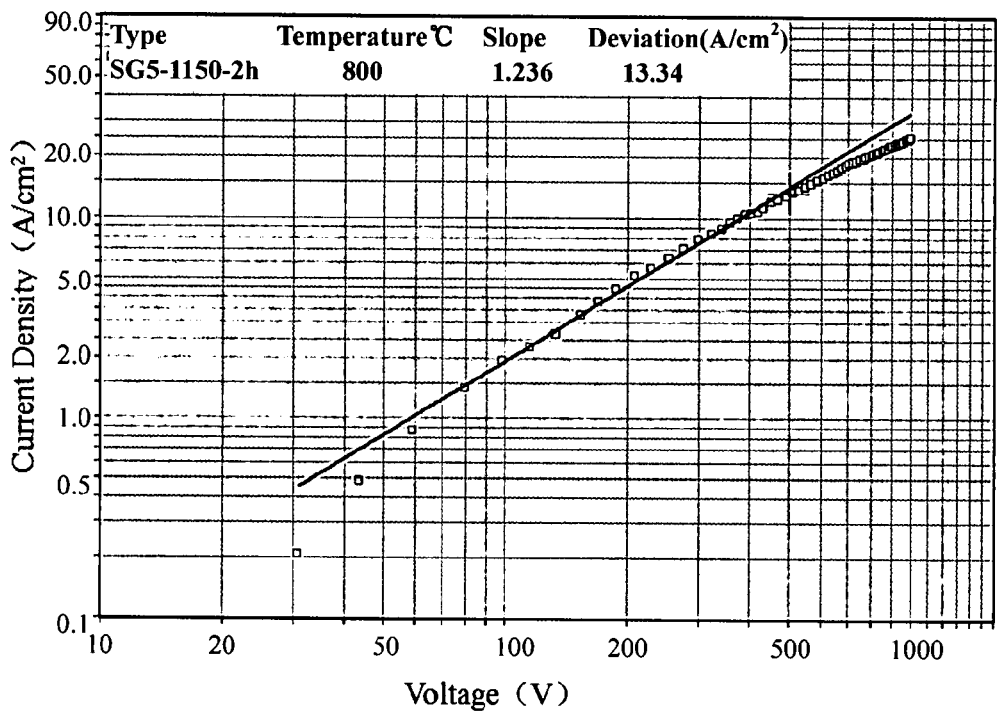
FIG. 3 shows the LgU-LgI plot of the cathode (Example 2) prepared by reduction in the atmosphere of hydrogen at a temperature of 1000° C. and then sintering at 1500° C. The precursor powder contains 5% wt $Sc_2O_3$ and 10% wt Barium-Calcium-Aluminates in the ratio of $BaO:CaO:Al_2O_3$ of 4:1:1. The emission current density is 13.34 $A/cm^2$ at 800° $C_{.b}$.
Figure 4:
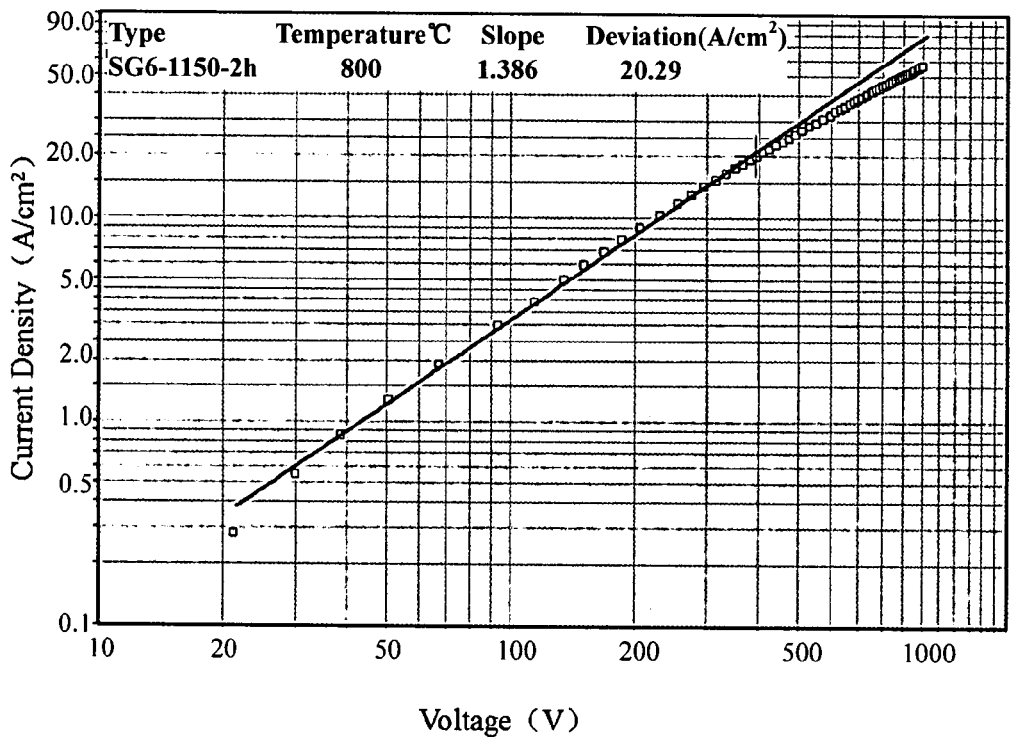
FIG. 4 shows the LgU-LgI plot of the cathode (Example 3) prepared by reduction in the atmosphere of hydrogen at a temperature of 850° C. and then sintering at 1550° C. The precursor powder contains 5% wt $Sc_2O_3$ and 10% wt Barium-Calcium-Aluminates in the ratio of $BaO:CaO:Al_2O_3$ of 4:1:1. The emission current density is 20.29 $A/cm^2$ at 800° $C_{.b}$.
Figure 5:
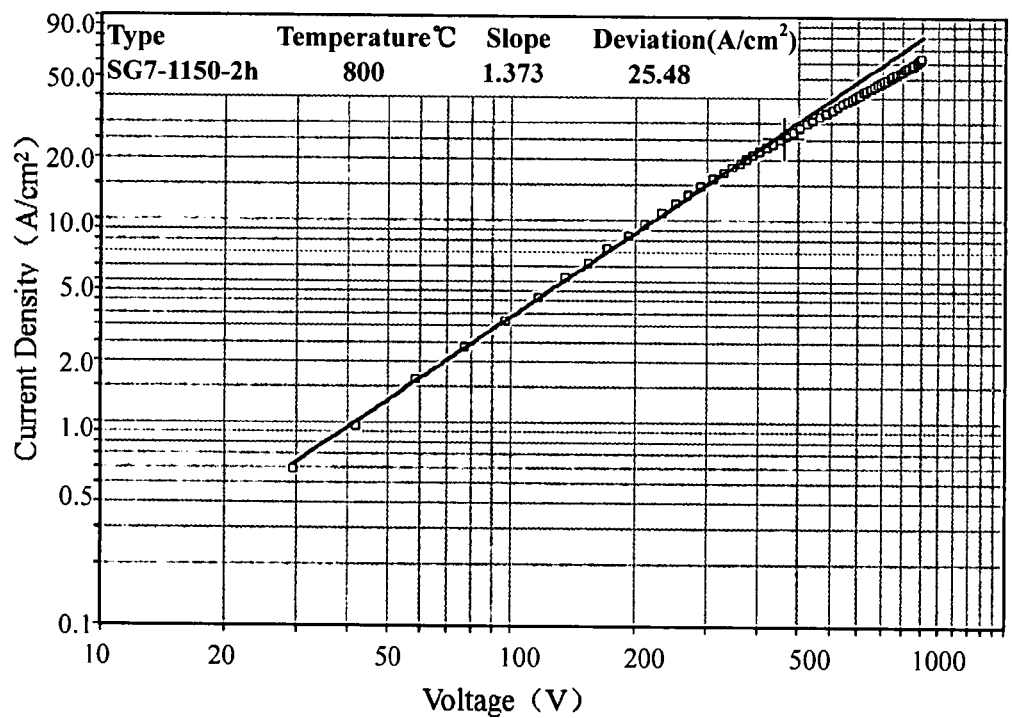
FIG. 5 shows the LgU-LgI plot of the cathode (Example 4) prepared by reduction in the atmosphere of hydrogen at a temperature of 950° C. and then sintering at 1600° C. 5% wt $Sc_2O_3$ and 10% wt Barium-Calcium-Aluminates in the ratio of $BaO:CaO:Al_2O_3$ of 4:1:1. The emission current density is 25.48 $A/cm^2$ at 800° $C_{.b}$.
Figure 6:
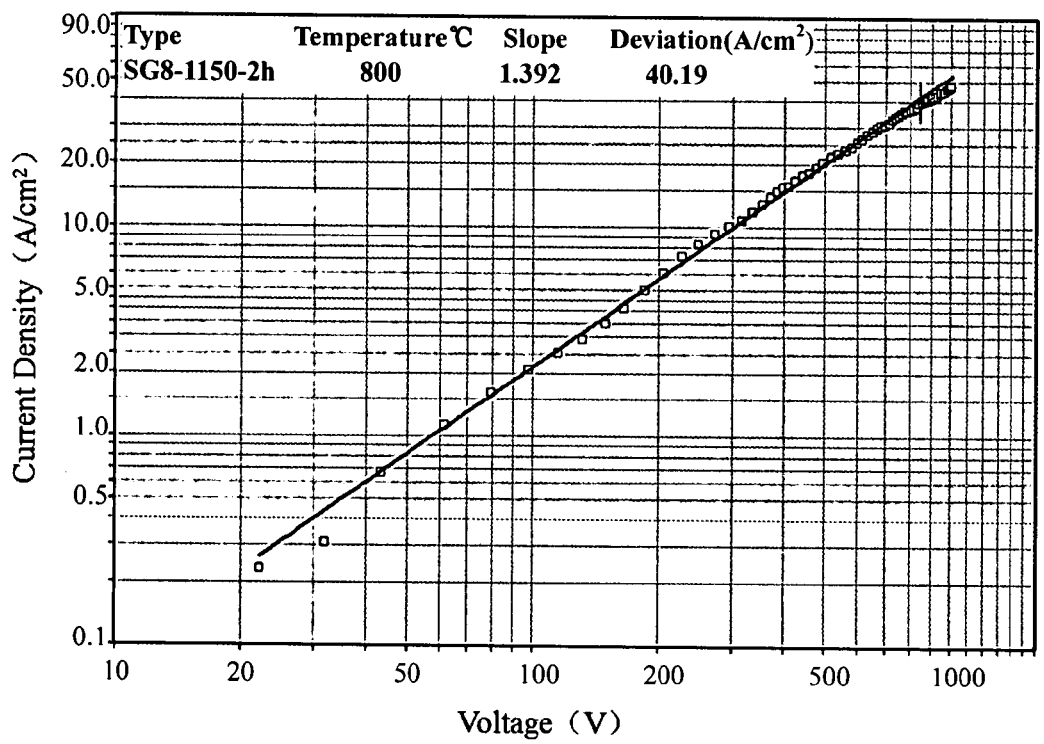
FIG. 6 shows the LgU-LgI plot of the cathode (Example 5) prepared by reduction in the atmosphere of hydrogen at a temperature of 1000° C. and then sintering at 1650° C. The precursor powder contains 3% wt $Sc_2O_3$ and 15% wt Barium-Calcium-Aluminates in the ratio of $BaO:CaO:Al_2O_3$ of 4:1:1. The emission current density is 40.19 $A/cm^2$ at 800° $C_{.b}$.
Figure 7:
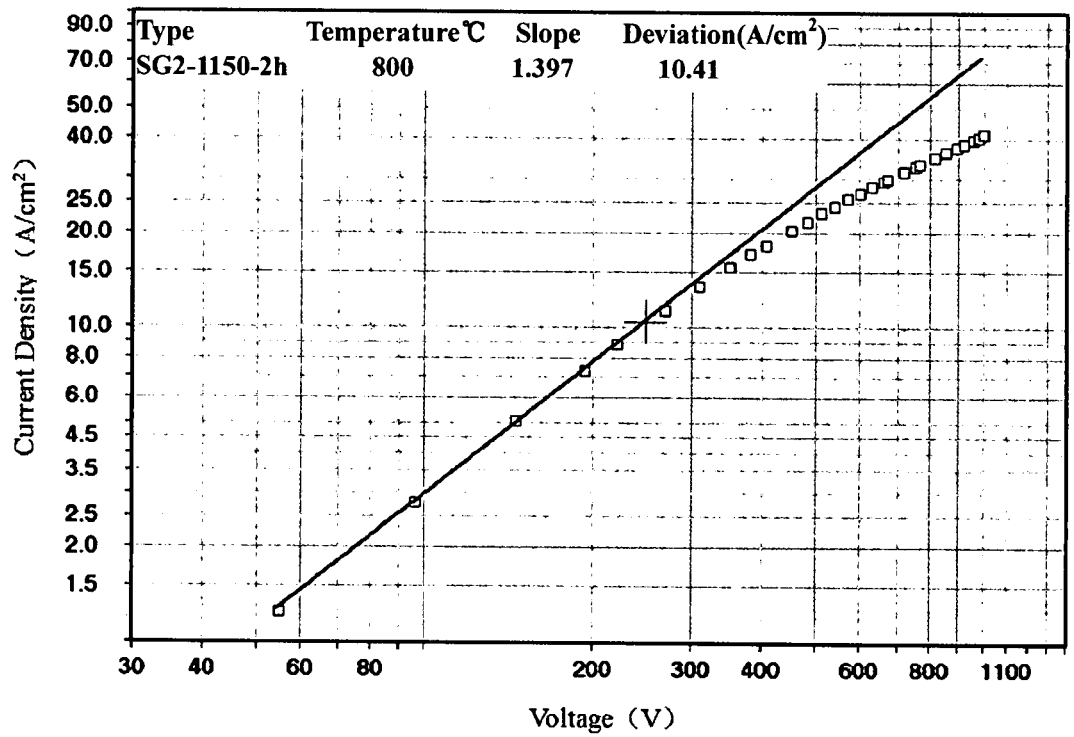
FIG. 7 shows the LgU-LgI plot of the cathode (Example 6) prepared by reduction in the atmosphere of hydrogen at a temperature of 900° C. and then sintered at 1100° C. by Sparking Plasma Sintering. The precursor powder contains 3% wt $Sc_2O_3$ and 5% wt Barium-Calcium-Aluminates in the ratio of $BaO:CaO:Al_2O_3$ of 4:1:1. The emission current density is 10.41 $A/cm^2$ at 800° $C_{.b}$.
Figure 8:
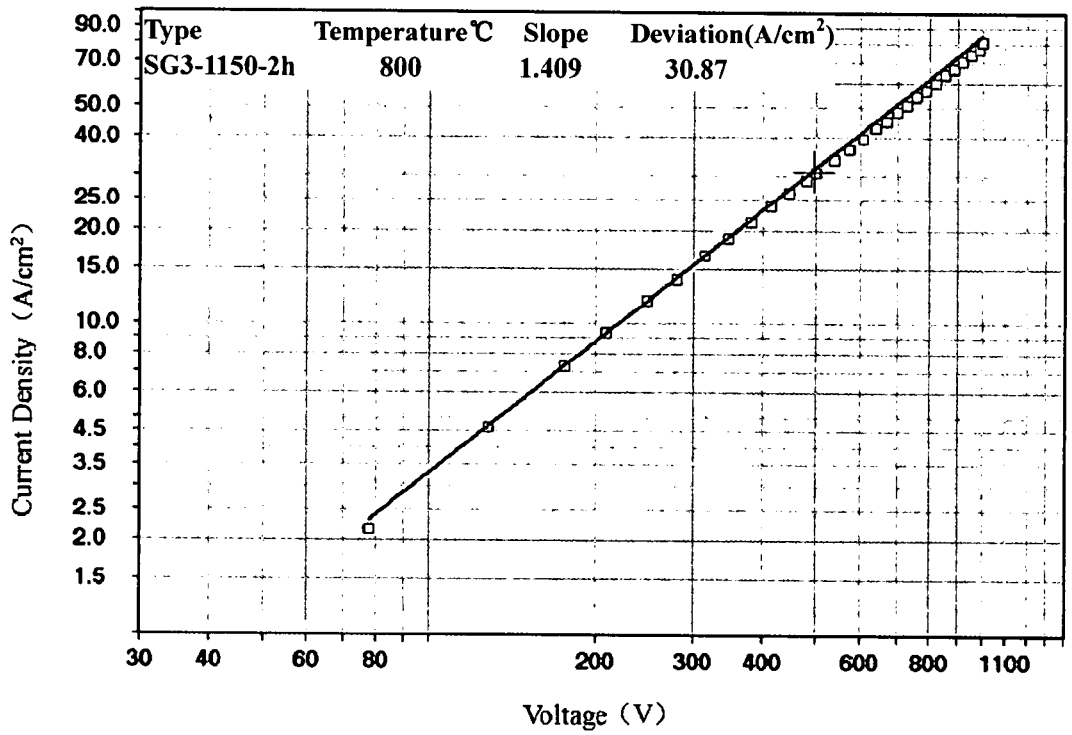
FIG. 8 shows the LgU-LgI plot of the cathode (Example 7) prepared by reduction in the atmosphere of hydrogen at a temperature of 1000° C. and then sintered at 1450° C. by Sparking Plasma Sintering. The precursor powder contains 3% wt $Sc_2O_3$ and 15% wt Barium-Calcium-Aluminates in the ratio of $BaO:CaO:Al_2O_3$ of 4:1:1. The emission current density is 30.87 A/cm at 800° $C_{.b}$.
Figure 9:
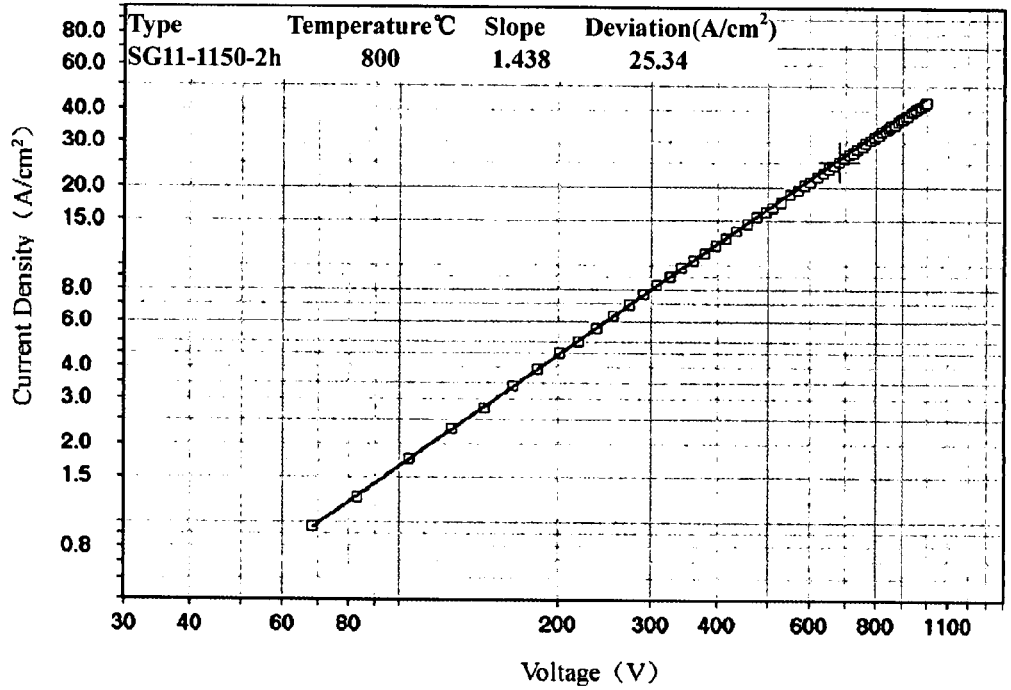
FIG. 9 shows the LgU-LgI plot of the cathode (Example 8) prepared by reduction in the atmosphere of hydrogen at a temperature of 1000° C. and then sintered at 1600° C. The precursor powder contains 3% wt $Sc_2O_3$ and 15% wt Barium-Calcium-Aluminates in the ratio of $BaO:CaO:Al_2O_3$ of 4:1:1. The emission current density is 25.34 $A/cm^2$ at 800° $C_{.b}$.
Figure 10:
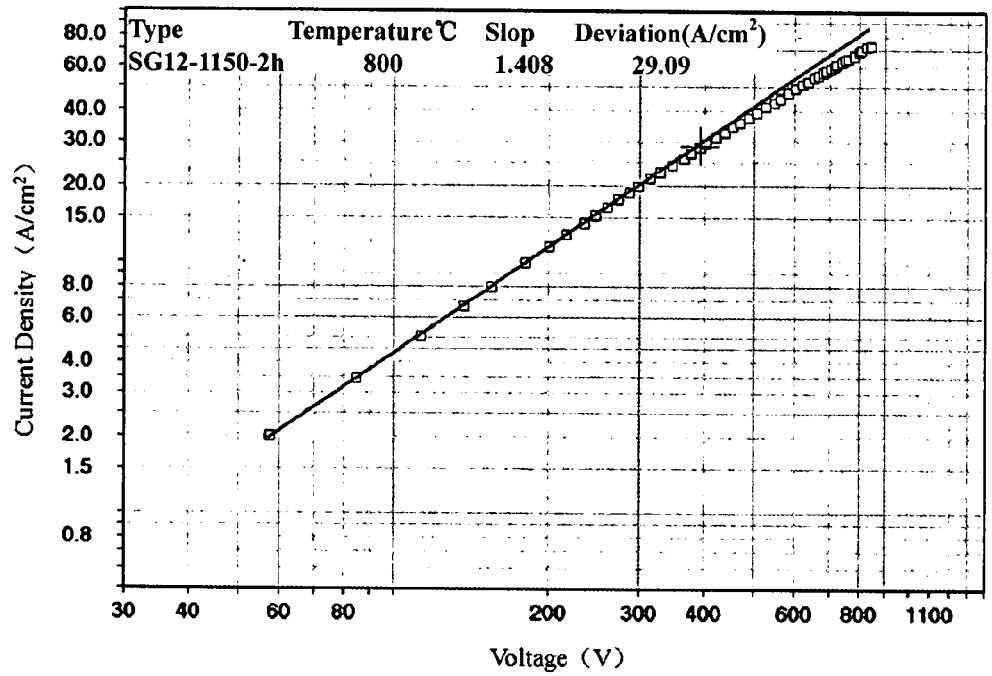
FIG. 10 shows the LgU-LgI plot of the cathode (Example 9) prepared by reduction in the atmosphere of hydrogen at a temperature of 950° C. and then sintering at 1600° C. The precursor powder contains 3% wt $Sc_2O_3$ and 15% wt Barium-Calcium-Aluminates in the ratio of $BaO:CaO:Al_2O_3$ of 4:1:1. The emission current density is 29.09 $A/cm^2$ at 800° $C_{.b}$.

The aqueous solution of 2.1976 g of $Sc(NO_3)_3.4H_2O$, 0.4864 g of $Al(NO_3)_3.9H_2O$, 12.4422 g of $(NH_4)_6H_6W_{12}O_{40}.5H_2O$ 10 g of $H_3Cit$, 0.6775 g of $Ba(NO_3)_2$, 0.1531 g of $Ca(NO_3)_2.4H_2O$ was dissolved in the de-ionized water, respectively. The aqueous solution of nitric salt prepared in the first step was mixed together, and then AMT-1 aqueous solution was added into the mixed aqueous solution, and finally, the citric acid aqueous solution was added into the mixed aqueous solution. The water bathing of the mixed aqueous solution was performed at 80° C. till the solution turned into gel, and then gel was calcined at 500° C. for 5 hours to get the composite oxides containing the elements of barium, aluminum, scandium, tungsten, calcium. The oxide powder was reduced by two steps, 500° C. for 2 hours and then 900° C. for 2 hours in hydrogen atmosphere to obtain the composite oxide doped tungsten powders. The powder was pressed into the pellets with the size of $\Phi3\times1.2$ mm under the pressure of 2.5 $t/cm^2$. Finally, the pellet was sintered in the atmosphere of hydrogen at 1450° C. for 10 minutes and shaped into cathode needed.

Example 2

The aqueous solution of 2.1976 g of $Sc(NO_3)_3.4H_2O$, 0.9728 g of $Al(NO_3)_3.9H_2O$, 11.7510 g of $(NH_4)_6H_6W_{12}O_{40}.5H_2O$, 10 g of $H_3Cit$, 1.3550 g of $Ba(NO_3)_2$, 0.3062 g of $Ca(NO_3)_2.4H_2O$ was dissolved in the de-ionized water, respectively. The aqueous solution of nitric salt prepared in the first step was mixed together, and then the AMT aqueous solution was added into the mixed aqueous solution, and finally, the citric acid aqueous solution was added into the mixed aqueous solution. The water bathing of the mixed aqueous solution was performed at 100° C. till the solution turned into gel, and then gel was calcined at 550° C. for 2 hours to get the composite oxides containing the elements of barium, aluminum, scandium, tungsten, calcium. The oxide powder was reduced by two steps, 500° C. for 2 hours and then 1000° C. for 2 hours in hydrogen atmosphere to obtain the composite oxide doped tungsten powders. The powder was pressed into the pellets with the size of $\Phi5\times1.2$ mm under the pressure of 2.0 $t/cm^2$. Finally, the pellet was sintered in the atmosphere of hydrogen at 1500° C. for 1 minute and shaped into cathode needed.

Example 3

The aqueous solution of 2.1976 g of $Sc(NO_3)_3.4H_2O$, 0.9728 g of $Al(NO_3)_3.9H_2O$, 11.7510 g of $(NH_4)_6H_6W_{12}O_{40}.5H_2O$, 10 g of $H_3Cit$, 1.3550 g of $Ba(NO_3)_2$, 0.3062 g of $Ca(NO_3)_2.4H_2O$ was dissolved in the de-ionized water, respectively. The aqueous solution of nitric salt prepared in the first step was mixed together, and then the AMT aqueous solution was added into the mixed aqueous solution, and finally, the citric acid aqueous solution was added into the mixed aqueous solution. The water bathing of the mixed aqueous solution was performed at 90° C. till the solution turned into sol, and then increasing the water temperature to 100° C. and keeping at this temperature till the sol turned into gel. The gel was calcined at 550° C. for 5 hours to get the composite oxides containing the elements of barium, aluminum, scandium, tungsten, calcium. The oxide powder was reduced by two steps, 500° C. for 2 hours and then 850° C. for 2 hours in hydrogen atmosphere to obtain the composite oxide doped tungsten powders. The powder was pressed into the pellets with the size of $\Phi 3 \times 1.2$ mm under the pressure of 2.5 t/cm$^2$. Finally, the said pellet was sintered in the atmosphere of hydrogen at 1550° C. for 1 minute and shaped into cathode needed.

Example 4

The aqueous solution of 2.1976 g of $Sc(NO_3)_3 \cdot 4H_2O$, 0.9728 g of $Al(NO_3)_3 \cdot 9H_2O$, 11.7510 g of $(NH_4)_6H_6W_{12}O_{40} \cdot 5H_2O$, 10 g of $H_3Cit$, 1.3550 g of $Ba(NO_3)_2$, 0.3062 g of $Ca(NO_3)_2 \cdot 4H_2O$ was dissolved in the de-ionized water, respectively. The aqueous solution of nitric salt prepared in the first step was mixed together, and then the AMT aqueous solution was added into the mixed aqueous solution, and finally, the citric acid aqueous solution was added into the mixed aqueous solution. The water bathing of the mixed aqueous solution was performed at 80° C. till the solution turned into sol and then increasing the water temperature to 90° C. and keeping at this temperature till the sol turned into gel. The gel was calcined at 550° C. for 5 hours to get the composite oxides containing the elements of barium, aluminum, scandium, tungsten, calcium. The oxide powder was reduced by two steps, 500° C. for 2 hours and then 950° C. for 2 hours in hydrogen atmosphere to obtain the composite oxide doped tungsten powders. The powder was pressed into the pellets with the size of $\Phi 3 \times 1.2$ mm under the pressure of 2.5 t/cm$^2$. Finally, the pellet was sintered in the atmosphere of hydrogen at 1600° C. for 1 minute and shaped into cathode needed.

Example 5

The aqueous solution of 1.3186 g of $Sc(NO_3)_3 \cdot 4H_2O$, 1.4592 g of $Al(NO_3)_3 \cdot 9H_2O$, 11.3362 g of $(NH_4)_6H_6W_{12}O_{40} \cdot 5H_2O$, 10 g of $H_3Cit$, 2.0325 g of $Ba(NO_3)_2$, 0.4593 g of $Ca(NO_3)_2 \cdot 4H_2O$ was dissolved in the de-ionized water, respectively. The aqueous solution of nitric salt prepared in the first step was mixed together, and then the AMT aqueous solution was added into the mixed aqueous solution, and finally, the citric acid aqueous solution was added into the mixed aqueous solution. The water bathing of the mixed aqueous solution was performed at 80° C. till the solution turned into sol and then increasing the water temperature to 100° C. and keeping at this temperature till the sol turned into gel. The gel was calcined at 550° C. for 5 hours to get the composite oxides containing the elements of barium, aluminum, scandium, tungsten, calcium. The oxide powder was reduced by two steps, 500° C. for 2 hours and then 1000° C. for 2 hours in hydrogen atmosphere to obtain the composite oxide doped tungsten powders. The powder was pressed into the pellets with the size of $\Phi 3 \times 1.2$ mm under the pressure of 2.5 t/cm$^2$. Finally, the pellet was sintered in the atmosphere of hydrogen at 1650° C. for 1 minute and shaped into cathode needed.

Example 6

The aqueous solution of 1.3186 g of $Sc(NO_3)_3 \cdot 4H_2O$, 0.4864 g of $Al(NO_3)_3 \cdot 9H_2O$, 12.7187 g of $(NH_4)_6H_6W_{12}O_{40} \cdot 5H_2O$, 10 g of $H_3Cit$, 0.6775 g of $Ba(NO_3)_2$, 0.1531 g of $Ca(NO_3)_2 \cdot 4H_2O$ was dissolved in the de-ionized water, respectively. The aqueous solution of nitric salt prepared in the first step was mixed together, and then the AMT aqueous solution was added into the mixed aqueous solution, and finally, the citric acid aqueous solution was added into the mixed aqueous solution. The water bathing of the mixed aqueous solution was performed at 80° C. till the solution turned into sol and then increasing the water temperature to 90° C. and keeping at this temperature till the sol turned into gel. The gel was calcined at 550° C. for 2 hours to get the composite oxides containing the elements of barium, aluminum, scandium, tungsten, calcium. The oxide powder was reduced by two steps, 500° C. for 2 hours and then 950° C. for 2 hours in hydrogen atmosphere to obtain the composite oxide doped tungsten powders. The powder was sintered by Sparking Plasma Sintering (SPS3.202-MK-V) at 1100° C. for 10 minutes and shaped into cathode needed.

Example 7

The aqueous solution of 1.3186 g of $Sc(NO_3)_3 \cdot 4H_2O$, 1.4592 g of $Al(NO_3)_3 \cdot 9H_2O$, 11.3362 g of $(NH_4)_6H_6W_{12}O_{40} \cdot 5H_2O$, 10 g of $H_3Cit$, 2.0325 g of $Ba(NO_3)_2$, 0.4593 g of $Ca(NO_3)_2 \cdot 4H_2O$ was dissolved in the de-ionized water, respectively. The aqueous solution of nitric salt prepared in the first step was mixed together, and then the AMT aqueous solution was added into the mixed aqueous solution, and finally, the citric acid aqueous solution was added into the mixed aqueous solution. The water bathing of the mixed aqueous solution was performed at 80° C. till the solution turned into a sol and then increasing the water temperature to 90° C. and keeping at this temperature till the sol turned into gel. The gel was calcined at 550° C. for 5 hours to get the composite oxides containing the elements of barium, aluminum, scandium, tungsten, calcium. The oxide powder was reduced by two steps, 500° C. for 2 hours and then 950° C. for 2 hours in hydrogen atmosphere to obtain the composite oxide doped tungsten powders. The powder was sintered by Sparking Plasma Sintering (SPS3.202-MK-V) at 1450° C. for 1 minute and shaped into cathode needed.

Example 8

The aqueous solution of 1.3186 g of $Sc(NO_3)_3 \cdot 4H_2O$, 1.4592 g of $Al(NO_3)_3 \cdot 9H_2O$, 11.3362 g of $(NH_4)_6H_6W_{12}O_{40} \cdot 5H_2O$, 10 g of $H_3Cit$, 2.0325 g of $Ba(NO_3)_2$, 0.4593 g of $Ca(NO_3)_2 \cdot 4H_2O$ was dissolved in the de-ionized water, respectively. The aqueous solution of nitric salt prepared in the first step was mixed together, and then the AMT aqueous solution was added into the mixed aqueous solution, and finally, the citric acid aqueous solution was added into the mixed aqueous solution. The water bathing of the mixed aqueous solution was performed at 80° C. till the solution turned into sol and then increasing the water temperature to 100° C. and keeping at this temperature till the sol turned into gel. The gel was calcined at 550° C. for 5 hours to get the composite oxides containing the elements of barium, aluminum, scandium, tungsten, calcium. The oxide powder was reduced by two steps, 500° C. for 3 hours and then 1000° C. for 1 hour in hydrogen atmosphere to obtain the composite oxide doped tungsten powders. The powder was pressed into the pellets with the size of $\Phi 3 \times 1.2$ mm under the pressure of 2.0 t/cm$^2$. Finally, the pellet was sintered in the atmosphere of hydrogen at 1600° C. for 1 minute and shaped into cathode needed.

Example 9

The aqueous solution of 1.3186 g of $Sc(NO_3)_3 \cdot 4H_2O$, 1.4592 g of $Al(NO_3)_3 \cdot 9H_2O$, 11.3362 g of $(NH_4)_6H_6W_{12}O_{40} \cdot 5H_2O$, 10 g of $H_3Cit$, 2.0325 g of $Ba(NO_3)_2$, 0.4593 g of $Ca(NO_3)_2 \cdot 4H_2O$ was dissolved in the de-ionized water, respectively. The aqueous solution of nitric salt prepared in the first step was mixed together, and then the AMT aqueous solution was added into the mixed aqueous solution, and finally, the citric acid aqueous solution was added into the mixed aqueous solution. The water bathing of the mixed aqueous solution was performed at 80° C. till the solution turned into sol and then increasing the water temperature to 100° C. and keeping at this temperature till the sol turned into gel. The gel was calcined at 550° C. for 5 hours to get the composite oxides containing the elements of barium, aluminum, scandium, tungsten, calcium. The oxide powder was reduced by two steps, 500° C. for 1 hour and then 950° C. for 3 hours in hydrogen atmosphere to obtain the composite oxide doped tungsten powders. The powder was pressed into the pellets with the size of Φ3×1.2 mm under the pressure of 2.5 t/cm². Finally, the pellet was sintered in the atmosphere of hydrogen at 1600° C. for 2 minutes and shaped into cathode needed.

The invention claimed is:

1. A method of manufacturing pressed scandate doped cathodes comprising the steps of:
    providing $Sc(NO_3)_3 \cdot xH_2O$, $Ba(NO_3)_2$, $Ca(NO_3)_2 \cdot xH_2O$, $Al(NO_3)_3 \cdot xH_2O$ and $(NH_4)_6H_6W_{12}O_{40} \cdot xH_2O$ (AMT) as raw materials, wherein the raw materials correspond to 3-5 wt % of $Sc_2O_3$, total 5 wt %-15 wt % of CaO, $Al_2O_3$ and BaO, and balanced with the $(NH_4)_6H_6W_{12}O_{40} \cdot xH_2O$ (AMT);
    dissolving the raw materials in de-ionized water, respectively, to obtain a raw material solution;
    mixing the raw material solution with a cross-linking agent solution to form a sol in a water bath at a temperature between 80° C. and 100° C.;
    drying the sol in air at a temperature between 80° C. and 100° C. to form a gel;
    calcining the gel in the atmosphere of air/oxygen at a temperature between 500° C. and 550° C. for 2-5 hours to obtain complex oxide powders;
    reducing the complex oxide powders at a temperature of 500° C. in the atmosphere of hydrogen, followed by reduction at a temperature between 850° C. and 1000° C. in the atmosphere of hydrogen, so as to obtain composite oxide doped tungsten powders;
    pressing the composite oxide doped tungsten powders at a pressure between 1.5 t/cm² to 2.5 t/cm² and sintering in the atmosphere of hydrogen at a temperature between 1450° C. and 1650° C. for 1 to 10 minutes or sintering in vacuum at a temperature between 1100° C. and 1450° C. for 1 to 10 minutes by Spark Plasma Sintering (SPS apparatus type 3.202-MK-V), to form the pressed scandate doped cathodes.

2. The method of claim 1, wherein the cross-link agent is citric acid.

3. A method of manufacturing composite oxide doped tungsten powders comprising the steps of:
    providing $Sc(NO_3)_3 \cdot xH_2O$, $Ba(NO_3)_2$, $Ca(NO_3)_2 \cdot xH_2O$, $Al(NO_3)_3 \cdot xH_2O$ and $(NH_4)_6H_6W_{12}O_{40} \cdot xH_2O$ (AMT) as raw materials, wherein the raw materials correspond to 3-5 wt % of $Sc_2O_3$, total 5 wt %-15 wt % of CaO, $Al_2O_3$ and BaO, and balanced with the $(NH_4)_6H_6W_{12}O_{40} \cdot xH_2O$ (AMT);
    dissolving the raw materials in de-ionized water, respectively, to obtain a raw material solution;
    mixing the raw material solution with a cross-link agent solution to form a sol;
    drying the sol to form a gel;
    calcining the gel to obtain complex oxide powders; and
    reducing the complex oxide powders at a first temperature for a first predetermined period of time in the atmosphere of hydrogen, followed by reduction at a second temperature higher than the first temperature for a second period of time in the atmosphere of hydrogen, so as to obtain the composite oxide doped tungsten powders.

4. The method of claim 3, wherein a solution of $Sc(NO_3)_3 \cdot xH_2O$, $Ba(NO_3)_2$, $Ca(NO_3)_2 \cdot xH_2O$, and $Al(NO_3)_3 \cdot xH_2O$ and a solution of $(NH_4)_6H_6W_{12}O_{40} \cdot xH_2O$ are first separately prepared, and then mixed to obtain the raw material solution.

5. The method of claim 3, wherein the step of mixing the raw material solution with the citric acid solution to form the sol is conducted in a water bath at a temperature between 80° C. and 100° C.

6. The method of claim 3, wherein the step of drying the sol to form the gel is conducted in air at a temperature between 80° C. and 100° C.

7. The method of claim 3, wherein the step of calcining the gel to obtain the complex oxide powders is conducted in the atmosphere of air/oxygen at a temperature between 500° C. and 550° C. for 2-5 hours.

8. The method of claim 3, wherein the step of reducing the complex oxide powders is conducted at a first temperature of about 500° C. for 1-3 hours, followed by reduction at a second temperature between 850° C. and 1000° C. for 1-3 hours in the atmosphere of hydrogen.

9. The method of claim 3, wherein the cross-link agent is citric acid.

10. A method of manufacturing pressed scandate doped cathode using the composite oxide doped tungsten powders of claim 3, comprising the steps of:
    pressing the composite oxide doped tungsten powders at a pressure between 1.5 t/cm² to 2.5 t/cm² into pellets;
    sintering the pellets in the atmosphere of hydrogen at a temperature between 1450° C. and 1650° C. for 1 to 10 minutes, or sintering the pellets in vacuum at a temperature between 1100° C. and 1450° C. for 1 to 10 minutes, to form the pressed scandate doped cathode.

* * * * *